(12) United States Patent
Tiesler et al.

(10) Patent No.: US 6,685,262 B1
(45) Date of Patent: Feb. 3, 2004

(54) FOAM IN PLACE INTEGRAL AIR DUCT

(75) Inventors: John M. Tiesler, Harrison Township, MI (US); Bari W. Brown, Ann Arbor, MI (US); George B. Byma, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/249,250

(22) Filed: Mar. 26, 2003

(51) Int. Cl.7 ................................................ B60R 13/02
(52) U.S. Cl. ........................ 296/214; 296/208; 454/137
(58) Field of Search ................... 296/208, 214; 454/136–137

(56) References Cited

U.S. PATENT DOCUMENTS

| | | |
|---|---|---|
| 3,366,026 A * | 1/1968 | Herr et al. .................. 296/214 |
| 5,527,581 A | 6/1996 | Sugawara et al. |
| 6,062,635 A | 5/2000 | Learman et al. |
| 6,071,591 A | 6/2000 | Dausch |
| 6,086,145 A | 7/2000 | Wandyez |
| 6,120,090 A * | 9/2000 | Van Ert et al. ............. 296/214 |
| 6,126,228 A * | 10/2000 | Davis, Jr. et al. .......... 296/214 |
| 6,214,098 B1 | 4/2001 | Lee |
| 6,309,012 B1 | 10/2001 | Fryk et al. |
| 6,375,778 B1 | 4/2002 | Cremades Schulz et al. |
| 6,383,599 B1 * | 5/2002 | Bell et al. ................... 296/208 |
| 6,409,947 B1 | 6/2002 | Wandyez |
| 6,561,576 B2 * | 5/2003 | Breymaier .................. 296/214 |
| 2001/0011834 A1 | 8/2001 | Boyce et al. |
| 2001/0042935 A1 | 11/2001 | Barber et la. .............. 264/46.4 |
| 2002/0093225 A1 | 7/2002 | Grimm ........................ 296/21 |
| 2002/0145236 A1 | 10/2002 | Wandyez .................... 264/523 |

* cited by examiner

Primary Examiner—Dennis H. Pedder
(74) Attorney, Agent, or Firm—Bill C. Panagos

(57) ABSTRACT

A headliner assembly for an automotive vehicle is provided. The headliner assembly utilizes a pre-formed headliner and a preformed inflatable permanent air duct liner which is molded in place using foam to substantially surround and adhere said air duct liner to said headliner.

8 Claims, 3 Drawing Sheets

FOAM IN PLACE INTEGRAL AIR DUCT

BACKGROUND OF INVENTION

1. Field of the Invention

The present invention generally relates to making a headliner with integral air ducts assembly for use in automotive vehicles. More particularly, the present invention relates to providing an automotive headliner integral air duct assembly which utilizes a preformed headliner and air ducts created by fluid inflation of a preformed inflatable bladder. More specifically, but without restriction to the particular embodiment and/or use which is shown and described for the purposes of illustration, the present invention relates to an method of making an assembly which incorporates a preformed headliner, and a preformed inflated bladder permanently embedded in foam forming a one piece automotive headliner/air duct assembly.

2. Description of the Related Art

Most automotive vehicles carry a number of passengers. Typically, these passengers are disposed in rows throughout the vehicle. The driver and front seat passenger are traditionally disposed in a front row of seats. Additional passengers are located in a rear row of seats. Typical sedans have two rows of seats. Other vehicles, such as sport utility vehicles, station wagons, buses, and trucks may have a front row of seats and one or more rear rows of seats.

In order to control the temperature in the vehicle cabin, a heating, ventilation, and air conditioning system (HVAC) is provided. The HVAC cooperates with the engine of the vehicle to force conditioned air into the cabin of the vehicle. Typically, the HVAC provides the conditioned air to the cabin via vents in the instrument panel of the vehicle. This location is generally chosen for its close proximity to the engine. The location of these vents provides ample conditioned air to the front row occupants of a vehicle; however, the rear row occupants obtain minimal conditioned air from vents located in the instrument panel.

Inside vehicle roof constructions now usually include laminated headliners. Such headliners are used in many types of vehicles including passenger cars, vans, busses, trucks, sport utility vehicles, trains and airplanes. Headliners are incorporated into vehicle roof constructions for a variety of reasons including aesthetics, sound absorption, energy absorption, and concealment of electrical wiring harnesses and air vents.

Materials currently used in headliner construction include particleboard, fiberboard, plastic board, scrim, fabric, plastic, various foams and resin-bonded chopped glass fiber. In some headliners, layers of these materials are joined together into a single laminate structure using lay-up-molding techniques. For example, some headliners are constructed using glass reinforced polyester resin laminated to a rigid urethane foam layer and covered by a soft urethane foam backed fabric. Other headliners are thermoformed laminates that include a polystyrene foam layer sandwiched between layers of Kraft paper or polymer film material and covered with soft polyurethane foam-backed fabric. Some constructions eliminate the paper or polymer film covering from such laminates and substitute a non-woven fabric batt adhered to one or both sides of the foam layer. Still other headliners, rather than being layered constructions, are simply molded from a single layer of a composition such as fiberglass reinforced polyester resin.

Headliners are typically contoured to conform to the dimensions of the vehicle roof structure they are intended to cover. Their dimensions are also contoured to flow into adjacent interior vehicle trim panels, pillars and other such structures to present a pleasing, finished aesthetic appearance to vehicle occupants.

In addition, it is known in the art for headliner assemblies to include a duct that is disposed on an upper surface of the headliners. Outlet registers are mounted in holes formed in the headliner at spaced locations. The duct directs airflow from a vehicle HVAC into a vehicle passenger compartment through the air outlet registers. In such systems, the duct is completely formed separately from the headliner and is fastened to the headliner during manufacturing by such means as gluing.

It is also known in the art to use blow-molded materials and in mold formed parisons to form ducts within the headliner substrate during the molding process of the headliner.

U.S. Pat. No. 6,086,145 issued Jul. 11, 2000 to Wandyez teaches a headliner assembly produced using a parison molded within a mold and then blow-molding the headliner substrate around said parison.

U.S. Pat. No. 6,409,947 issued Jun. 25, 2002 to Wandyez, a division of U.S. Pat. No. 6,086,145 teaches a method of making a molded headliner incorporating an air duct produced using a parison molded inside the headliner mold.

U.S. Published Application No. 2002/0145236 published Oct. 10, 2002 to Wandyez, a continuation of U.S. Pat. No. 6,409,947 teaches a method of introducing a molten parison into a mold to form the headliner of U.S. Pat. No. 6,086,145.

U.S. Published Application No. 2002/0093225 published Jul. 18, 2002 to Grimm teaches a method of producing cavities and cooperating grills as an integral part of a sandwich construction headliner for mounting of dazzle indirect lighting.

U.S. Published Application No. 2001/0042935 published Nov. 22, 2001 to Barber et al teaches a method of molding energy absorbing foam to a pre-formed headliner and the assembly so produced.

U.S. Pat. No. 6,383,599 issued May 7, 2002 to Bell et al teaches a automotive floor carpet assembly comprising a rigid air duct attached to the bottom of a automotive vehicle carpet assembly using urethane foam to fasten the air duct to the bottom of the carpet assembly and provide thermal insulation.

U.S. Pat. No. 6,375,778 issued Apr. 23, 2002 to Cremades Schulz et al teaches method of using a mold having multiple upper mold halves allowing for the formation of channels for mounting components such as wiring harnesses and air ducts between substrate layers of the headliner.

U.S. Pat. No. 6,309,012 issued Oct. 30, 2001 to Fryk et al teaches a one piece rotational molded roof for an automotive vehicle formed of two preformed rotational molded cooperating forms permanently bonded to one another using a foam resin.

U.S. Pat. No. 6,217,098 issued Apr. 17, 2001 to O'Brien et al teaches an instrument panel molded to produce a hard surface with a foam underside and having openings for various components molded therein.

U.S. Pat. No. 6,071,591 issued Jun. 6, 2000 to Dausch teaches a method of molding a vehicle dashboard having integral ducts formed by means of at least one at least partially absorbable removable insert, particularly an inflatable removable insert.

U.S. Pat. No. 6,062,635 issued May 16, 2000 to Learman et al teaches permanently mounting a pre-formed plastic air duct to the top surface of a preformed headliner.

U.S. Pat. No. 5,527,581 issued Jun. 18, 1996 to Sugawara et al teaches a dashboard and method of molding the dashboard such that air outlet grills are formed as an integral part of the dashboard for mounting duct work from the HVAC system to the back of the dashboard.

DISCLOSURE OF THE INVENTION

The present invention is directed to providing a headliner assembly having in-place air ducts mounted in foam to reduce the amount of parts and complexity introduced to an automotive assembly plant.

More particularly, the invention resides in providing a headliner assembly utilizing a pre-formed headliner, a pre-formed inflatable air duct which when mounted in a mold with the pre-formed headliner is inflated to form a desired air duct shape and the headliner assembly is permanently assembled by utilizing polymer foam to secure the air duct to the headliner.

One object of the present invention is to allow for the production of a headliner assembly having permanently mounted air ducts which can be produced using a preformed headliner and a preformed inflatable air duct liner without the necessity of requiring a molten parison to be formed in a molding process to produce the headliner itself.

Another object of the present invention is to produce a headliner assembly which does not require the removal of the air duct liner after the foaming step in producing the headliner assembly.

A further object of the present invention is a headliner assembly for an automobile comprising: a pre-formed automobile headliner; at least one pre-formed inflatable air duct liner; and a foam material adhering said air duct liner to the backside or top surface of said pre-formed automobile headliner; thereby forming at least one air duct on the backside of said pre-formed automobile headliner.

Yet another object of the present invention is a headliner assembly for a motor vehicle having a heating and air conditioning system, a permanent roof, said headliner assembly comprising: a pre-formed headliner fitted to cover the interior surface of the permanent roof; at least one permanent air duct liner disposed between the interior surface of said permanent roof and the backside surface of said pre-formed said permanent air duct liner forming a air duct cooperatively connected to the motor vehicle HVAC system wherein said air duct is adapted to provide the occupants with conditioned air from the HVAC system; and foam disposed on the backside surface of said pre-formed headliner and substantially about said air duct liner; said air duct adapted to provide conditioned air to the passenger compartment.

Still another object of the present invention is a process for forming a headliner assembly comprising a pre-formed headliner, a pre-formed inflatable permanent air duct liner, and foam comprising: mounting the pre-formed headliner in a first mold half; positioning at least one pre-formed inflatable permanent air duct liner on the backside of said pre-formed headliner; mounting the second half of said mold onto said first half of said mold; attaching an inflation means to said at least one pre-formed inflatable permanent air duct liner; inflating said at least one pre-formed inflatable permanent air duct liner to a desired level; introducing a foam polyurethane into said mold using a molding means; and foaming said foam polyurethane to substantially surround said at least one pre-formed permanent air duct liner and permanently adhere said at least one preformed permanent air duct liner to said backside of said pre-formed headliner.

The present invention thus advantageously provides a headliner/air duct assembly which does not require simultaneous production to the headliner and air duct and further which does not require the air duct liner be removed after foaming in place.

A complete understanding of the present invention may be obtained from the drawings and detailed description that follow.

DETAILED DESCRIPTION

Figure 1:
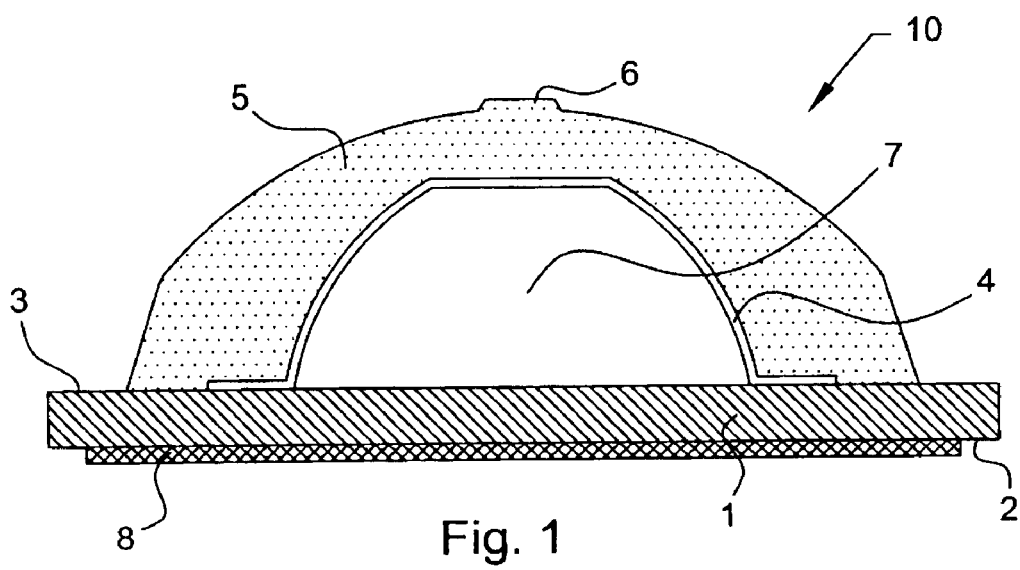
FIG. 1 shows a plan sectional view of the headliner with integral air duct assembly of the present invention with the integral air duct liner positioned in one preferred manner.

Reference will now be made to the drawings, wherein to the extent possible like reference numerals are utilized to designate like components throughout the various views. Referring to FIG. 1, which presents a plan sectional view of one preferred embodiment of the present invention 10 having a headliner 1 having an interior or bottom surface 2 having a upholstery covering 8 thereon and an upper surface 3, a inflatable air duct liner 4 is positioned with a substantial portion thereof against said upper surface 3 of headliner 1, the inflatable air duct liner 4 having been inflated to the desired shape by introducing an inflating fluid into said inflatable air duct liner 4 through an inflating fluid needle (not shown) producing an air passage way 7 therein. Also shown is foam 5 surrounding said inflatable air duct liner 4 and attaching said inflatable air duct liner 4 permanently to the foam 5 and the headliner 1 and in having an optional rub rib 6. Inflatable air duct liner 4 thereby becoming a permanent air liner in the headliner assembly of said present invention 10.

Figure 2:
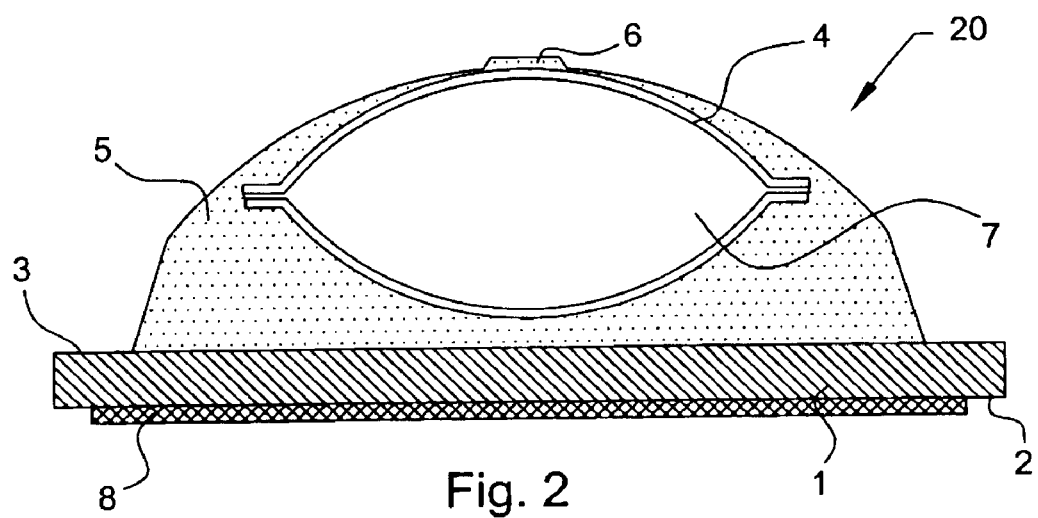
FIG. 2 shows a plan sectional view of the headliner with integral air duct assembly of the present invention with the integral air duct liner positioned in a second preferred manner.

Referring now to FIG. 2 there is presented a plan sectional view of another preferred embodiment of the present invention 20 having a headliner 1 having an interior or bottom surface 2 having a upholstery covering 8 thereon and an upper surface 3, an inflatable air duct liner 4 is positioned in the foam 5 at a desired distance above, and not in contact with, said upper surface 3 of headliner 1, the inflatable air duct liner 4 having been inflated to the desired shape by introducing an inflating fluid into said inflatable air duct liner 4 through an inflating fluid needle (not shown) producing an air passage way 7 therein. Also shown is foam 5 surrounding said inflatable air duct liner 4 and attaching said inflatable air duct liner 4 to the foam 5 and the headliner 1 and having an optional rub rib 6. Inflatable air duct liner 4 thereby becoming a permanent air duct liner in the headliner assembly of said present invention 20.

Figure 3:
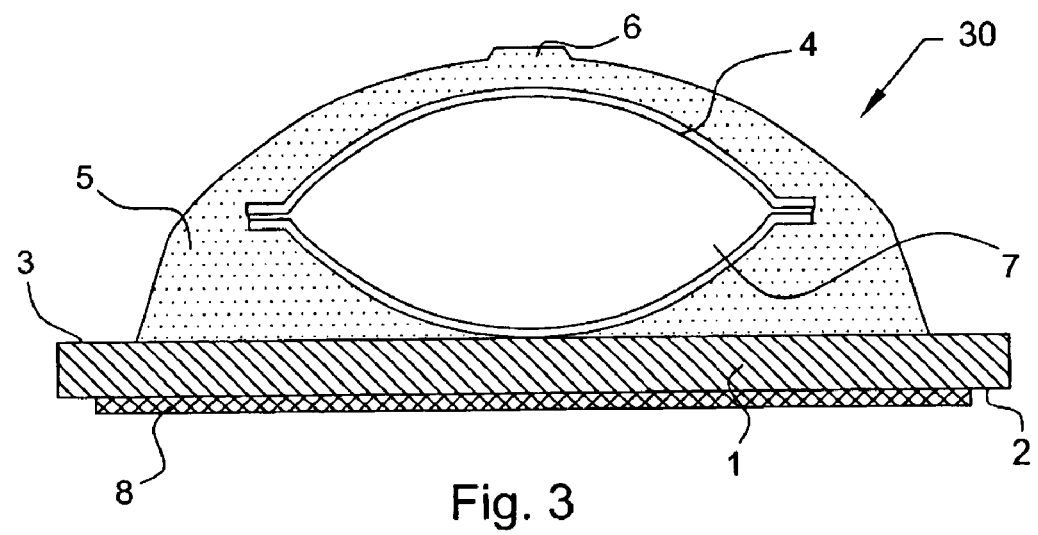
FIG. 3 shows a plan sectional view of the headliner with integral air duct assembly of the present invention positioned with the integral air duct liner positioned in another preferred manner.

Referring to FIG. 3 there is presented a plan sectional view of still another preferred embodiment of the present invention 30 having a headliner 1 having an interior or bottom surface 2 having a upholstery covering 8 thereon and an upper surface 3, an inflatable air duct liner 4 is positioned to be in touching relationship on said upper surface 3 of headliner 1, the inflatable air duct liner 4 having been inflated to the desired shape by introducing an inflating fluid into said inflatable air duct liner 4 through an inflating needle (not shown) producing an air passage way 7 therein. Also shown is foam 5 surrounding said inflatable air duct liner 4 and attaching said inflatable air duct liner 4 permanently to the foam 5 and the headliner 1 and having optional rub rib 6. Inflatable air duct liner 4 thereby becoming a permanent air duct liner in the headliner assembly of said present invention 30.

Figure 4:
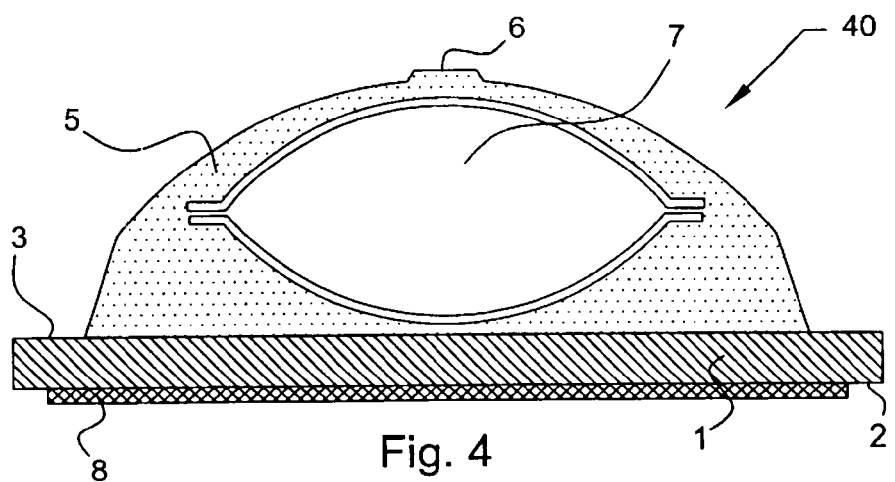
FIG. 4 shows a plan sectional view of the headliner with integral air duct assembly of the present invention with the integral air duct liner positioned in yet another preferred manner.

Further referring to FIG. 4 there is presented a plan sectional view of still another preferred embodiment of the present invention 30 having a headliner 1 having an interior or bottom surface 2 having a upholstery covering 8 thereon and an upper surface 3, an inflatable air duct liner 4 is positioned substantially equally between said upper surface 3 of headliner 1 and the upper periphery of foam 5, the inflatable air duct liner 4 having been inflated to the desired shape by introducing an inflating fluid into said inflatable air duct liner 4 through an inflating needle (not shown) producing an air passage way 7 therein. Also shown is foam 5 surrounding said inflatable air duct liner 4 and attaching said inflatable air duct liner 4 to the foam 5 and the headliner 1 and having an optional rub rib 6. Inflatable air duct liner 4 thereby becoming a permanent air duct liner in the headliner assembly of said present invention 40.

Figure 5:
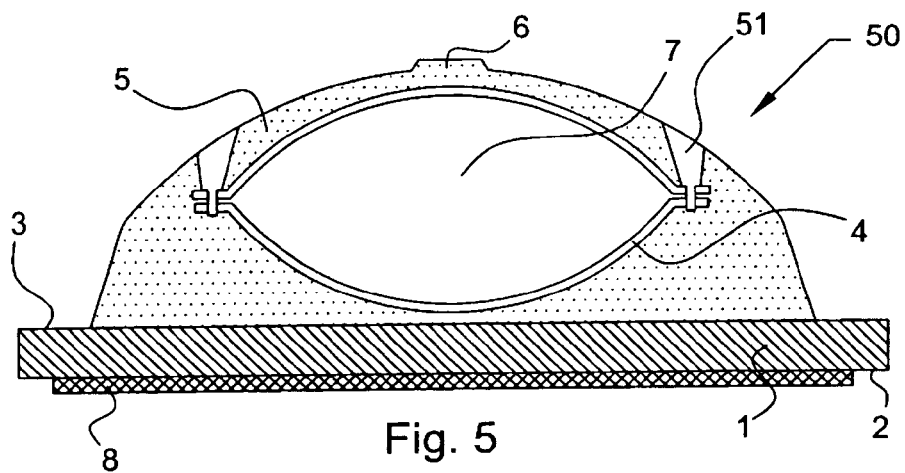
FIG. 5 shows a plan sectional view of the headliner with integral air duct assembly of the present invention with the integral air duct liner with the holes left by the mold positioning/holding pins.

Still further referring to FIG. 5 there is presented a plan sectional view of still another preferred embodiment of the present invention 30 having a headliner 1 having an interior or bottom surface 2 having a upholstery covering 8 thereon and an upper surface 3, an inflatable air duct liner 4 is positioned similarly as in FIG. 4 between said upper surface 3 of headliner 1 and the upper periphery of foam 5, and further having holes 51 remaining from the locating pins used in the mold to locate and maintain the position of said air duct liner 4 during the foaming process, the inflatable air duct liner 4 having been inflated to the desired shape by introducing an inflating fluid into said inflatable air duct liner 4 through an inflating needle (not shown) producing an air passage way 7 therein. Also shown is foam 5 surrounding said inflatable air duct liner 4 and attaching said inflatable air duct liner 4 to the foam 5 and the headliner 1 and having an optional rub rib 6. Inflatable air duct liner 4 thereby becoming a permanent air duct liner in the headliner assembly of said present invention 50.

Figure 6:
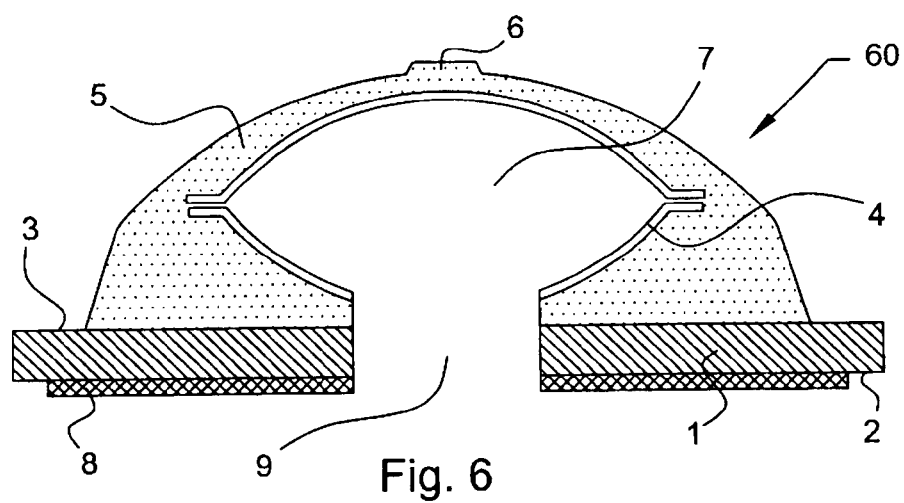
FIG. 6 shows a plan sectional view of the headliner with integral air duct assembly of the present invention with a air duct opening to allow passage of air through the headliner.

Referring to FIG. 6 there is presented a plan sectional view of another preferred embodiment of the present invention 60 having a headliner 1 having an interior or bottom surface 2 having a upholstery covering 8 thereon and an upper surface 3, an inflatable air duct liner 4 is positioned in a desired location on said upper surface of 3 of headliner 1, the inflatable air duct liner 4 having been inflated to the desired shape by introducing an inflating fluid into said inflatable air duct liner 4 through an inflating fluid needle (not shown) producing an air passage way 7 therein. Also shown is foam 5 surrounding said inflatable air duct liner 4 and attaching said inflatable air duct liner 4 permanently to the foam 5 and the headliner 1 and having an optional rub rib 6. Further there is shown an air control grill mounting opening 9 cut out through headliner 1, foam 5 and inflatable air duct liner 4 to allow for adjustment of air flowing into an automotive vehicle passenger compartment. Inflatable air duct liner 4 thereby becoming a permanent air duct liner in the headliner assembly of said present invention 60.

Figure 7:
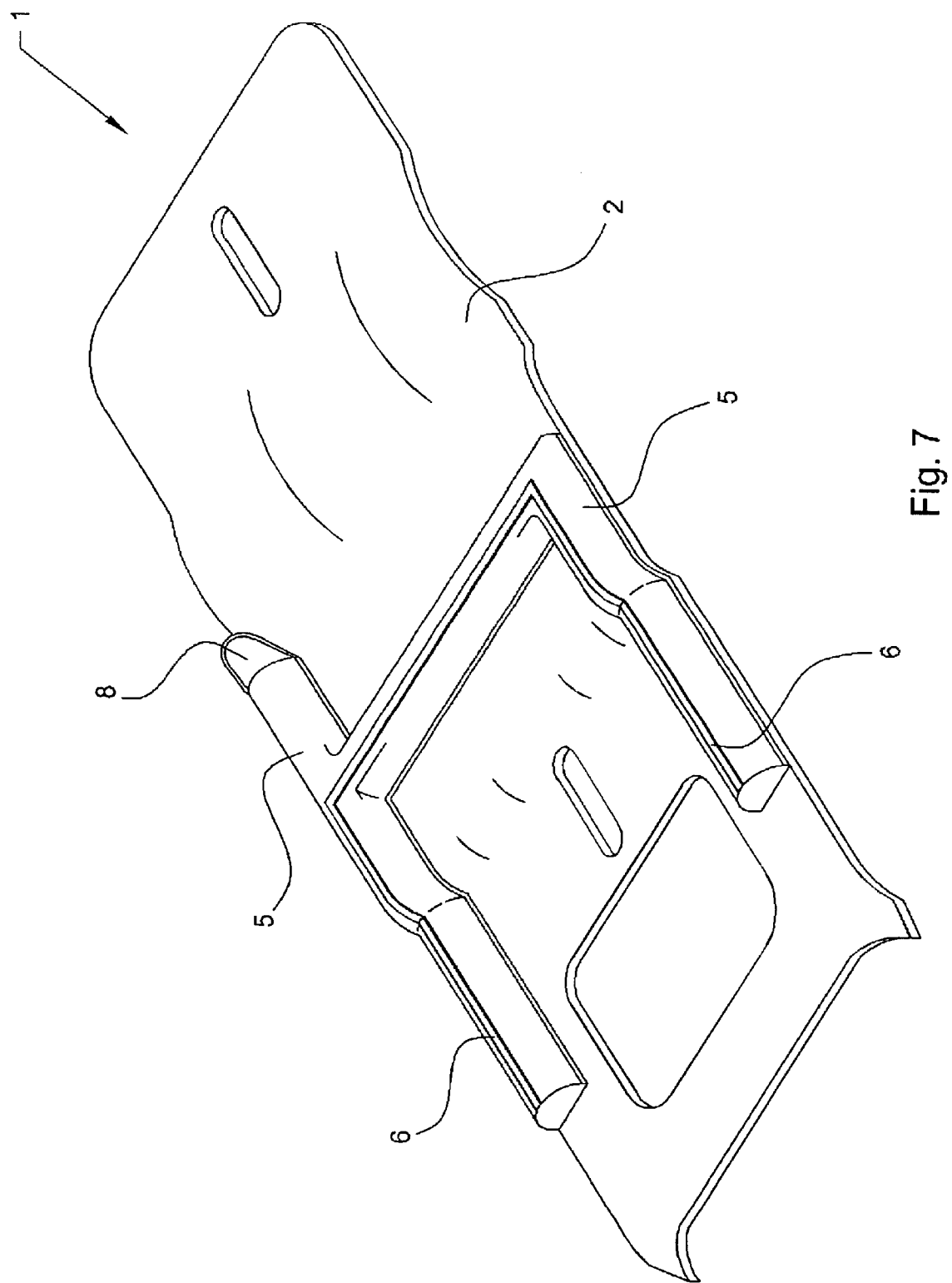
FIG. 7 shows a perspective view of a headliner having the integral air duct assembly of the present invention permanently positioned thereon within a foam.

Referring to FIG. 7 there is presented a perspective view of the bottom surface 2 of headliner 1 having an inflatable air duct liner 4 (not shown) permanently mounted to the bottom surface 2 of headliner 1 within foam 5 having optional rib 6. Also shown is the air duct opening 8 for connecting to the heating and air conditioning (HVAC) system of a vehicle.

It is understood that the duct liner 4 has the air passage opening 7 maintained in a permanent fashion by the adherence of the duct liner 4 to the foam 5.

In practice a pre-formed headliner 1 is placed, with the interior or bottom surface down, in one half of an appropriate two piece mold, at least one un-inflated air duct liner 4 is placed in a desired position on the top surface of the pre-formed headliner 1. It is preferred to provide a means of holding the inflated air duct in place during the molding of the foam. This may be accomplished by the design of the mold cavities, by the use of pressure sensitive adhesives (psa's), or most preferably by the use of locating pins within the mold to physically hold the air duct in position. (not shown). The second piece of the mold is mounted and secured to the first piece of the mold. An inflation means is attached to each such un-inflated air duct liner 4 positioned in the mold and an inflation fluid is introduced into the air duct liner 4 until is has been inflated to the desired level. An appropriate foam polyurethane is introduced into the mold and the polyurethane is allowed to foam to fill the mold and seal the air duct liner 4 in place and to the pre-formed headliner 1. After foaming the polyurethane the mold is opened and the resulting assembly of the present invention 10 is removed and trimmed as necessary for placement in a automotive vehicle. The molds and foaming polyurethanes suitable for use in the present invention are well known in the art. The presently preferred foam is urethane foam.

As can be seen in FIGS. 1 through 6 the foam substantially encapsulates most, or nearly most, of the air duct liner.

Suitable materials for making the inflatable air duct include, for example, any suitable thermoplastic film material and particularly polypropylene, polyethylene, and polyurethane film materials. The presently preferred material composition of the inflatable air duct liner is polypropylene.

The at least one air duct liner is positioned such that it cooperatively connects to the HVAC duct work extending from the HVAC unit to the roof of the automotive vehicle allowing for the transfer of conditioned air throughout the vehicle passenger compartment.

Although the preferred embodiments of the present invention has been disclosed, various changes and modifications may be made without departing from the scope of the invention as set forth in the appended claims.

What is claimed is:

1. A headliner assembly for an automobile comprising:
 a) a pre-formed automobile headliner;
 b) at least one pre-formed inflatable air duct liner; and
 c) a foam material adhering said air duct liner to the backside or top surface of said pre-formed automobile headliner;

thereby forming at least one air duct on the backside of said pre-formed automobile headliner.

2. The invention as claimed in claim 1 wherein, said air duct connects to the HVAC system of the automobile.

3. The invention as claimed in claim 1 wherein, said air duct includes openings therethrough to provide an exit for said duct into an automobile passenger compartment.

4. The invention as claimed in claim 1 wherein, said foam material substantially surrounds said air duct.

5. The invention as claimed in claim 1 wherein, said foam material is polyurethane foam.

6. The invention as claimed in claim 1 wherein, there is at least two of said air ducts.

7. The invention as claimed in claim 1 wherein, said headliner assembly is shaped to substantially conform to the roof of an automobile.

8. The invention as claimed in claim 1 wherein, said foam material is a thermal insulator.

* * * * *